T. S. PEARSON & T. M. CONNER.
AUTOMATIC BALING MACHINE.
APPLICATION FILED SEPT. 23, 1912.
1,075,376.
Patented Oct. 14, 1913.
5 SHEETS—SHEET 1.
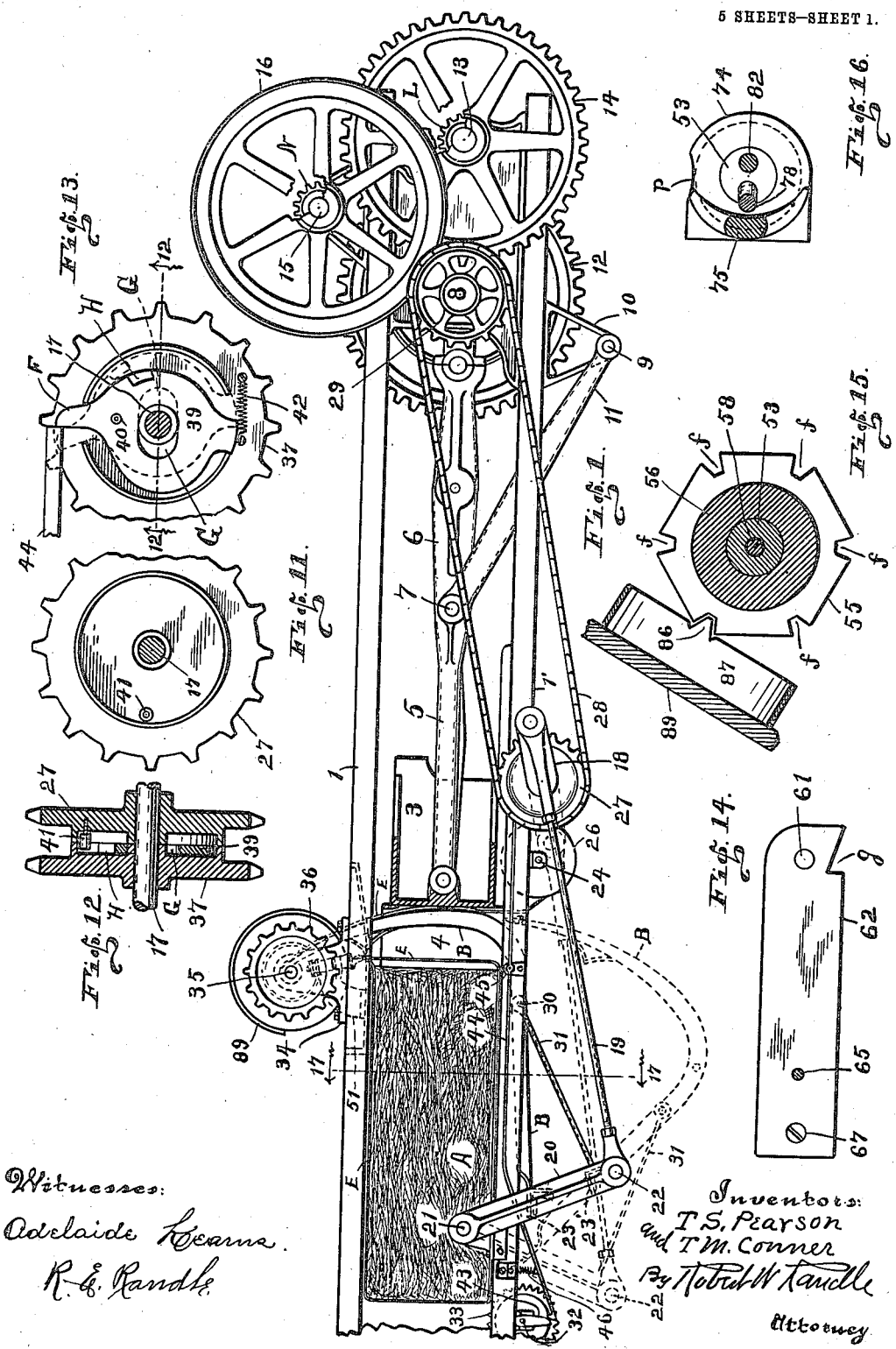
Witnesses:
Adelaide Kearns.
R. E. Randle.
Inventors:
T. S. Pearson
and T. M. Conner
By Robert W. Randle
Attorney

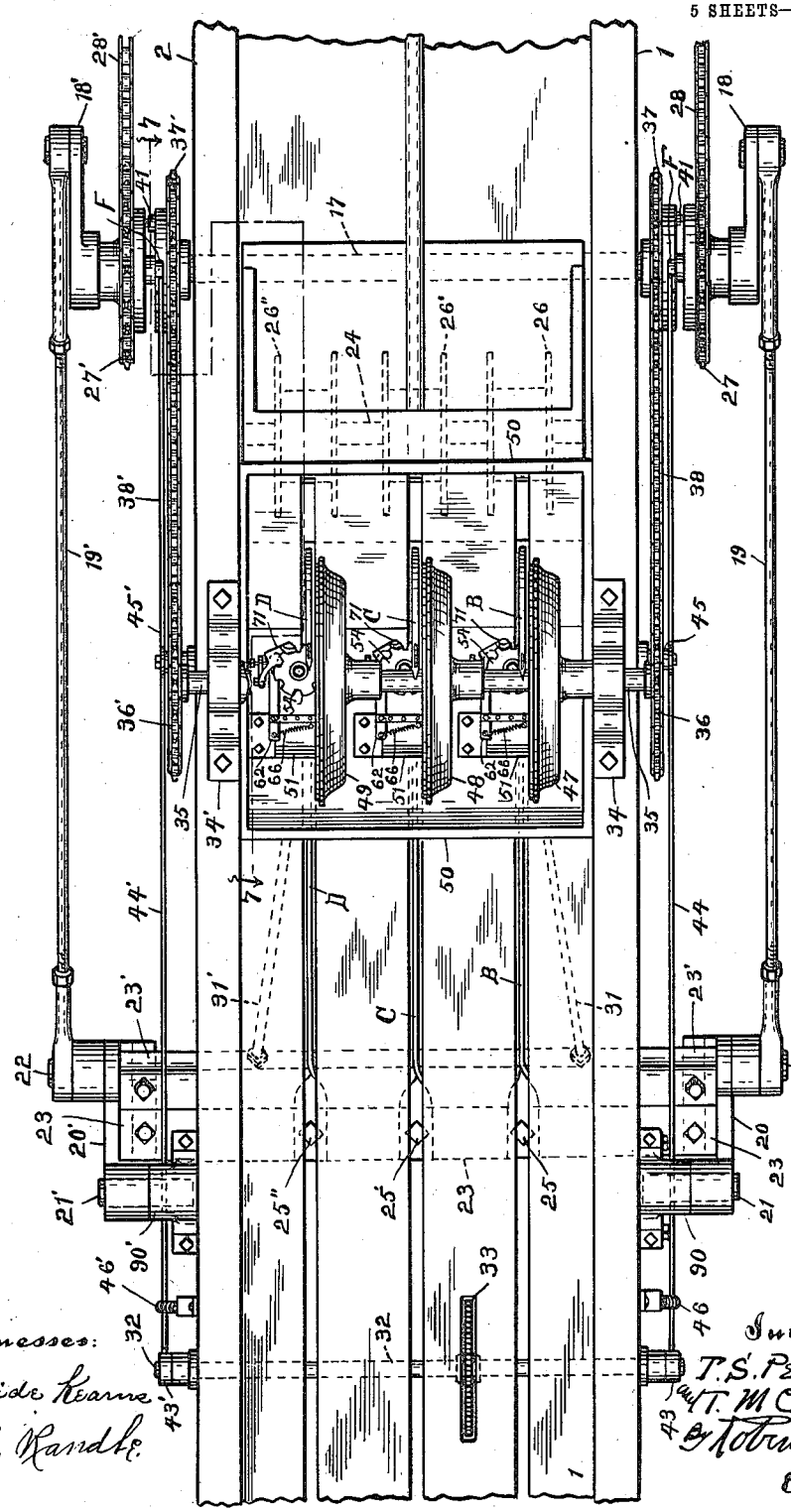

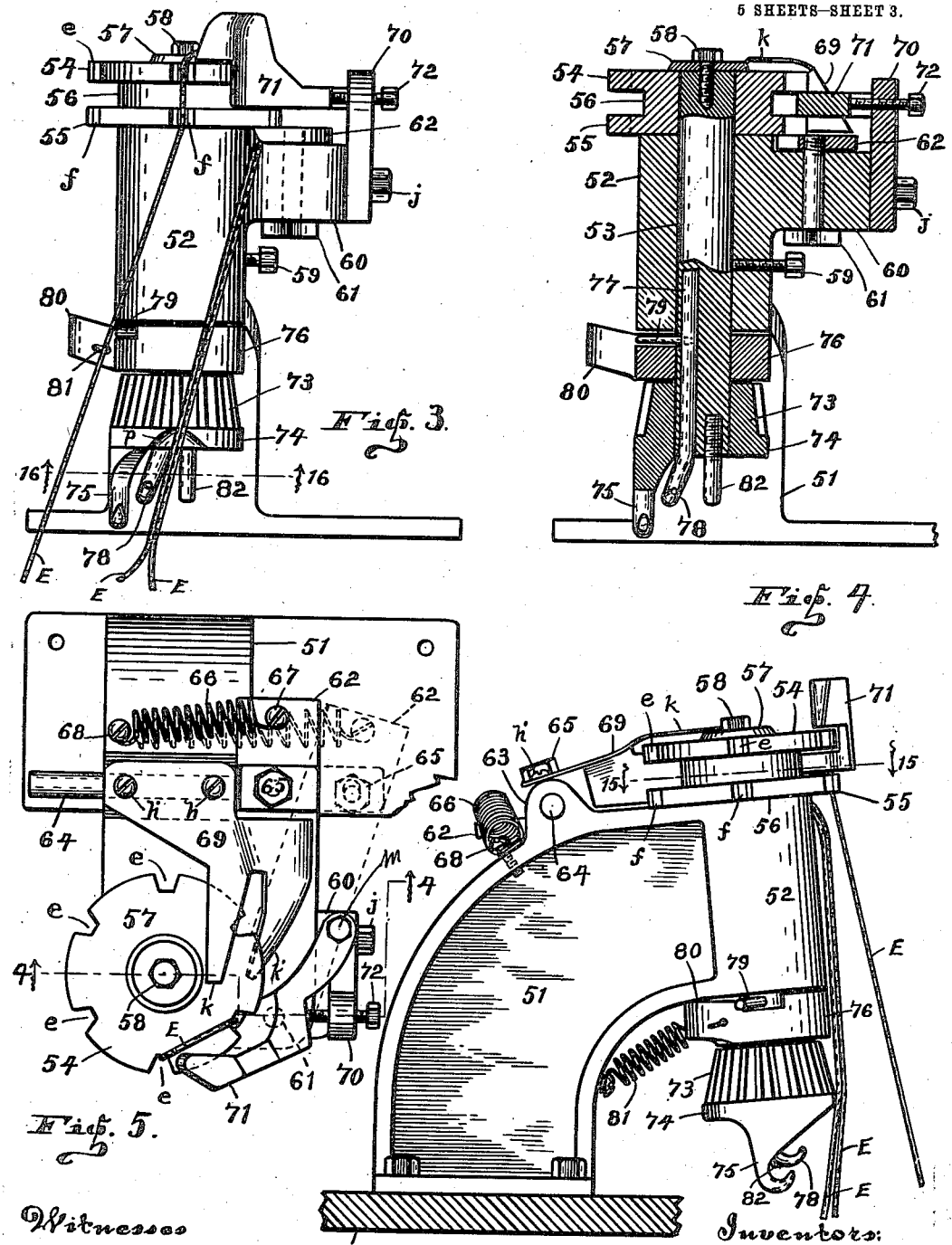

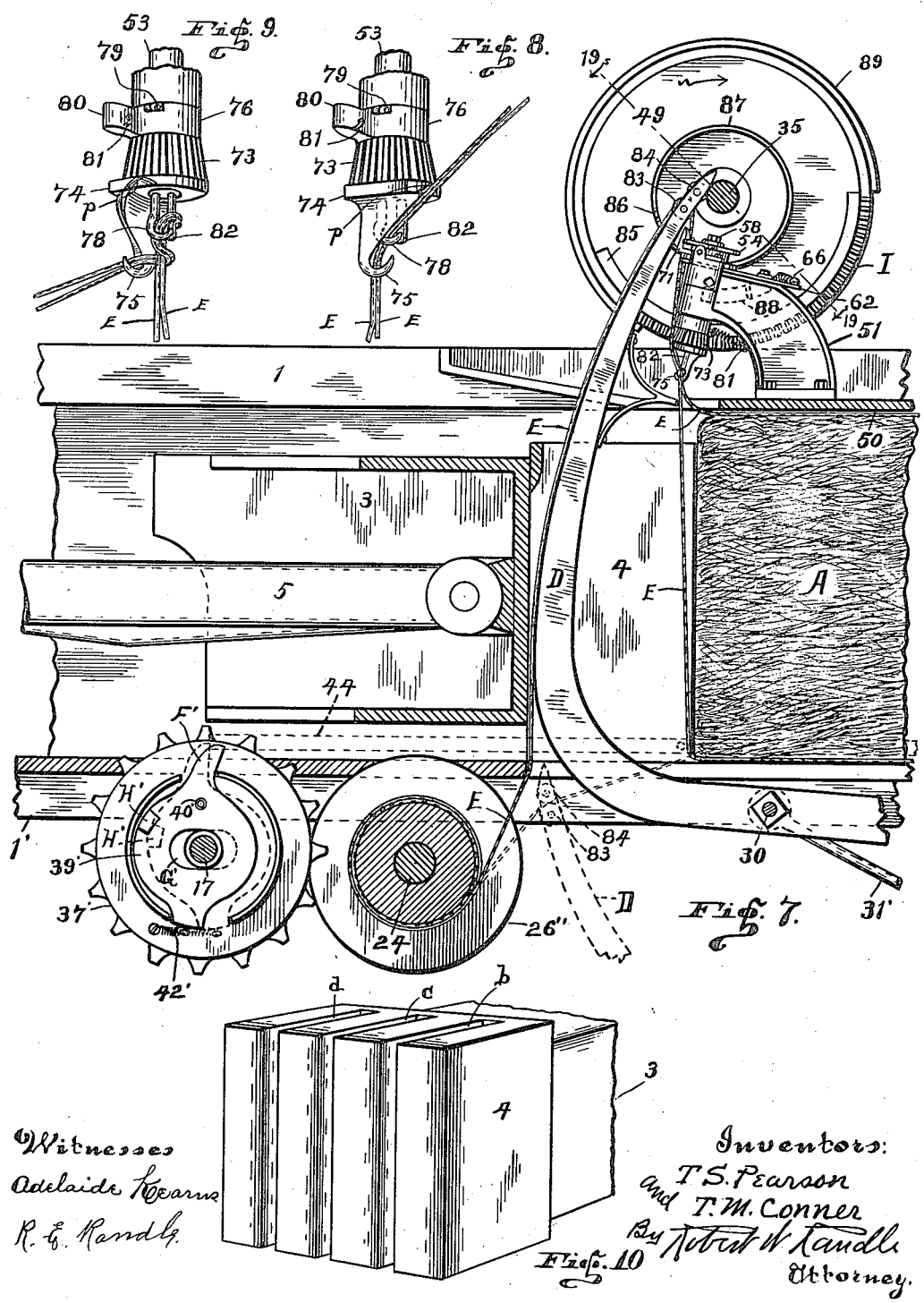

T. S. PEARSON & T. M. CONNER.
AUTOMATIC BALING MACHINE.
APPLICATION FILED SEPT. 23, 1912.

1,075,376. Patented Oct. 14, 1913.
5 SHEETS—SHEET 5.

Witnesses:
Adelaide Kearns
R. E. Randle.

Inventors:
T. S. Pearson
and T. M. Conner
By Robert W. Randle
Attorney.

UNITED STATES PATENT OFFICE.

THOMAS S. PEARSON AND THEODORE M. CONNER, OF KOKOMO, INDIANA, ASSIGNORS OF ONE-THIRD TO JOHN B. DOUGAN, OF RICHMOND, INDIANA.

AUTOMATIC BALING-MACHINE.

1,075,376. Specification of Letters Patent. Patented Oct. 14, 1913.

Application filed September 23, 1912. Serial No. 721,961.

*To all whom it may concern:*

Be it known that we, THOMAS S. PEARSON and THEODORE M. CONNER, both citizens of the United States, residing at Kokomo, in the county of Howard and State of Indiana, have invented a new and useful Automatic Baling-Machine, of which the following is a full, clear, and accurate specification of our preferred construction, being such as will enable others to make and use the same with absolute exactitude.

Our invention relates, in its broadest scope, to the baling of compressible material by an automatic organism wherein the several elements coact in harmonious accord so that the whole may be under the control and subject to the volition of a single operator.

This invention has for its main object the compression, and wiring, of hay, straw, cotton, or other compressible products, which hereinafter we will designate as the material, in securing the wires around the bales of material by ties or knots having a limited degree of yieldability, performing said results in a more certain and perfect manner and with greater rapidity than has heretofore been done by machines of this general character.

Perhaps the most important single feature and the specific object of our invention is the means for securing together of the two ends of a single wire into a yieldable knot or tie, and accomplishing the same while the wire is under a superstrain or an excess tension.

Other objects and particular advantages of our invention will be brought out in the course of the following specification.

The details of the invention and the manner of operation of the different mechanisms will be fully set forth hereinafter and the novel features thereof will be recited in the claims.

The preferred manner for the construction and the arrangement of the several parts, devices, and mechanisms are fully shown in the accompanying drawings forming part of this specification, in which—

Figure 17:
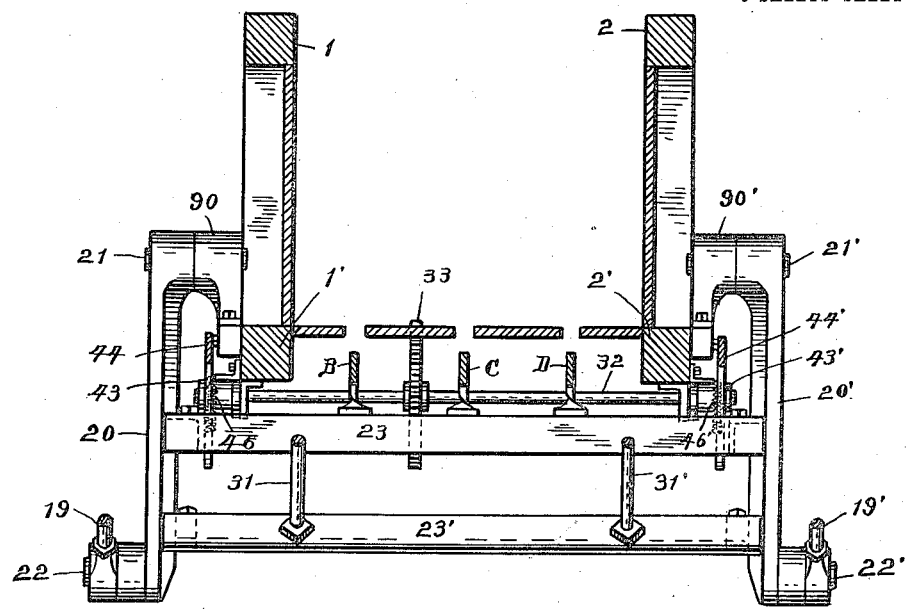
Figure 18:
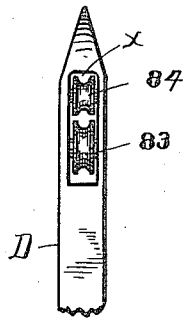
Figure 20:
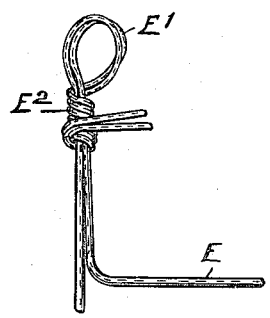
Figure 21:
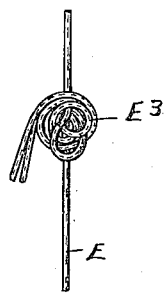
Figure 19:
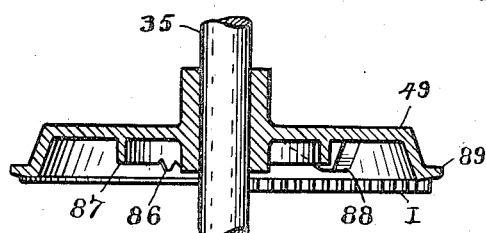
Figure 22:
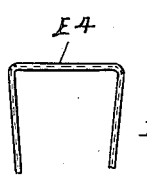

Figure 1 is a side elevation of the front portion of our machine. Fig. 2 is a top plan view of the central portion of our machine. Fig. 3 is a front elevation of one of the three twisters. Fig. 4 is a vertical section of one of the twisters, same being taken on line 4—4 of Fig. 5. Fig. 5 is a top plan view of one of the twisters. Fig. 6 is a side elevation of one of the twisters. Fig. 7 is an enlarged detail, partly in section, taken on line 7—7 of Fig. 2. Figs. 8 and 9 are two detail views showing different positions of the twisters when forming the tie. Fig. 10 is an isometrical detail of the block in which the needles operate. Fig. 11 is an inside face view of one side of one of the clutches. Fig. 12 is a central section taken through one of the clutches on line 12—12 of Fig. 13. Fig. 13 is an inside face view of one side of one of the clutches, same being located near and facing the member shown in Fig. 11. Fig. 14 is a plan view of the knife alone. Fig. 15 is a detail section taken on line 15—15 of Fig. 6. Fig. 16 is a plan view of the underside of the twister-block. Fig. 17 is a cross section taken through the machine on line 17—17 of Fig. 1. Fig. 18 is a face view of the point portion of one of the needles. Fig. 19 is a central section taken through one of the twister-wheels on line 19—19 of Fig. 7. Fig. 20 is a view of one of the completed ties. Fig. 21 shows one of the ties after the expansive pull of the bale has been applied thereto. And Fig. 22 shows one of the staples comprising the waste material from each tie.

Similar indices denote like parts throughout the several views of the drawings.

In order that the construction and the operation of our invention may be fully understood and that its several advantages may be fully appreciated we will now take up a detailed description thereof in which we will set forth the same as briefly and as comprehensively as we may be able to do.

The body of our invention comprises a framework consisting, primarily, of the four horizontal sills spaced apart forming a square in cross section, between the central portions of which is formed the compression chamber, in which the bales A are formed. Said sills comprise two, upper and lower, on the right-hand side, which are designated 1 and 1' respectively; and the two located on the left-hand side which are denoted by indices 2 and 2'.

A compression-chamber is formed in the central portion of the machine, as stated, in which chamber reciprocates the plunger 3. Secured on the face of the plunger is the needle block 4, through which the needles operate as hereinafter set forth. The plunger 3 is moved to and fro by the pitman 5 which has its rear end pivoted therein. The forward end of said pitman 5 is hinged to the rear end of the link or auxiliary pitman 6 by means of the pivot 7. The forward end of the link 6 is carried by a wrist mounted on the crank-shaft 8. However various means may be employed for operating the piston and we make no claim to such means in this application. Extending across below the frame, slightly rearward of crank-shaft 8, is the shaft 9 which is carried by brackets 10 extending down below the frame as indicated and for the purpose stated.

Pivoted at one end on shaft 9, with its other end mounted to pivot 7, is the arm 11. Secured on shaft 8 is the large gear-wheel 12. Supported in front of shaft 8 is shaft 13 on which is secured the intermediate gear-wheel 14. Mounted on brackets extending up from the frame is the shaft 15 on which is secured the drive-wheel 16. A pinion L is secured on shaft 13 and it meshes with the gear-wheel 12; and a pinion N is secured on shaft 15 and it meshes with the said gear-wheel 14.

Extending across below the frame, in front of the compression-chamber, is shaft 17 which projects at each end beyond the frame. Secured on the ends of shaft 17 are the cranks 18 and 18'. Extending rearward from said cranks are the adjustable connecting rods 19 and 19', respectively. The rear ends of said connecting rods are mounted to the respective pivots 22 and 22', which latter are carried by the lower ends of the respective swinging-arms 20 and 20', the upper ends of said arms being mounted on the respective pivots 21 and 21'. Said pivots 21 and 21' are each carried by a bracket secured to the sides of the frame, said brackets being designated 90 and 90', respectively. In this instance we propose to place three binding-wires around the bale A, therefore we employ three needles B, C and D, which are curved substantially as shown, same being adapted to operate through the respective slots b, c and d of the block 4. Secured on the two projecting portions of shaft 17, adjoining the cranks 18 and 18', are the respective sprocket-wheels 27 and 27' each of which is connected by a sprocket-chain, 28 and 28' respectively, to sprocket-wheels which are secured on the projecting ends of the crank-shaft 8, as for instance the wheel 29 as shown in Fig. 1, the other not appearing in the drawings. For operating the said needles we provide a swinging-frame, shown in Fig. 17. Extending across underneath the compression chamber, and rigidly secured to said swinging arms 20 and 20', are the upper and the lower angle-bars 23 and 23', respectively. The base or butt ends of the needles are all rigidly secured to the bar 23 by the bolts 25, 25' and 25'', respectively, as shown. Some distance from their bases the three needles are connected by the strut-and-stay rod 30, which holds them the proper distances apart and prevents them from swinging laterally. Said rod 30 is connected to the angle-bar 23' by two braces 31 and 31'.

By the above arrangement it is apparent that as the arms 20 and 20' swing backward and forward the points of the needles will be moved downward and upward, respectively, through said slots b, c and d.

Suspended from the underside of the frame, in the rear of shaft 17, is the free-shaft 24 on which is mounted the three spools 26, 26' and 26''. On each of said spools is to be wound a supply of wire, as the wire E shown in Fig. 7, and elsewhere. Extending across and mounted on the underside of the frame, at about the rear end of the compression-chamber, is the idle shaft 32. Secured on shaft 32, with a segment of its periphery projecting up through a slot in the floor of the compression-chamber, is the spur-wheel 33 which engages the underside of the bales A as they are being formed, thereby revolving said shaft 32. Mounted on top of the frame, over the front end of the compression chamber is the brackets 34 and 34' in which is mounted the main twister-shaft 35, and secured on the projecting ends of shaft 35 are the sprocket-wheels 36 and 36', by which it is moved. Rigidly mounted on shaft 17 are the two sprocket-wheels 37 and 37', which correspond with the respective wheels 36 and 36'. Connecting sprocket-wheel 37 with sprocket-wheel 36 is the sprocket chain 38; and likewise connecting the corresponding sprocket wheels on the other side of the machine is the chain 38'. A clutch is provided on each side of the machine, and as the two are identical with each other a description of one will answer for both: Said clutches are located between the opposing faces of each set of sprockets 27 and 37, as shown in Figs. 11, 12 and 13, the former showing the inner face of the part carried by sprocket-wheel 27, and the latter the inner face of the parts carried by sprocket-wheel 37, while the other view shows in section all the parts of the clutch combined in operative position. Each clutch consists of the dog 39 having an outwardly extending finger F extending beyond the periphery of the clutch proper, as in Fig. 13. Said dog has a horizontal oblong aperture G therethrough which loosely surrounds the shaft 17. Said dog is mounted by pivot 40 whereby it may swing, within the limits of the slot G. Extending out in an axial direction from the inner face of the dog 39 is the lug H. Extending from the face of the sprocket-wheel 27 and located near the periphery thereof is the roller 41 which is adapted to engage the lug H when the dog 39 swings in one direction and to be free therefrom when the dog swings in the opposite direction. The dog 39 is returned to its normal position, with relation to sprocket-wheel 37, by the helical spring 42, one end of said spring being attached to sprocket-wheel 37 and the other to the dog 39, as indicated. Secured on each end of shaft 32 is a cam, as cams 43 and 43'. Extending along near the lower sills of the frame is the bars 44 and 44', same being pivotally secured near their centers by the respective hangers 45 and 45'. The rear ends of said bars 44—44' are adapted to be impinged by the cams 43 and 43' at each revolution of the wheel 33, to cause the forward ends of said bars to be raised. When not so raised then the forward ends of said bars are lowered where they will be engaged by finger F of dogs 39. The forward ends of bars 44—44' are adapted to be returned to engage the fingers F by means of the helical spring 46, as shown.

*Twister mechanism.*—Spaced a proper distance apart and secured on shaft 35 are the three dished cam or twister-wheels 47, 48 and 49, which are duplicates of each other, the faces thereof being directed to the left, as shown in Fig. 7. Formed on a portion of the rim of each of said twister-wheels is a gear I which extends only a portion of the distance therearound ($\frac{1}{3}$ to $\frac{1}{2}$), and it adjoins the periphery thereof. When referring further to the twister-wheels we will mention the one indicated by numeral 49 and this of course will answer for all. Also as there are three twister mechanisms operated by the respective twister-wheels and as they are all duplicates of each other in construction and operation, therefore to simplify the description we will refer to corresponding parts of the three by like indices, and a description of one will of course answer for all. Extending across the top of the front end of the compression-chamber is a platform 50 on which the three twister mechanisms are secured, same being spaced according to the said twister-wheels. Each of the twisters includes a substantial angular casting or base 51, which, together with the twisters in detail, is shown in Figs. 3, 4, 5, and 6, the projections of said castings 51 being toward the front end of the machine, as shown in Fig. 7. Formed integral with the base 51 is the head thereof, designated by numeral 52, same being the terminal of the forward extension referred to above, same being at an angle from perpendicular. Extending up-and-down through and projecting above and below the head 52, and disposed at a slight angle from perpendicular, is the core 53 which is adjustable and it is round in cross section, and it is secured in place by the set-screw 59.

Revolubly mounted on the upper extension of the core 53, with its upper face even with the upper end thereof and its lower face resting on the top of the head 52, is a spool-shaped member, comprising an upper or cinch-disk 54, and the lower or cutter-disk 55, the two being spaced apart but integrally connected by the body or stem 56. Said spool-shaped member is retained in place by the washer 57 and the screw 58, as shown in Fig. 4. Formed in the periphery of the disk 54 are a plurality of square notches $e$ which are spaced some distance apart; and likewise in the periphery of the disk 55 an equal number of like notches $f$ are formed, same being in vertical alinement with notches $e$. The periphery of disk 54 forms a true circle, except for notches $e$; while the periphery of disk 55 is formed by straight lines extending between each two of the notches $f$, as shown in Fig. 15.

Formed integral with and extending out from the left side of the head 52 is the projection 60. Extending through projection 60 and parallel with the core 53 is the bolt 61, to the upper end of which is secured the knife 62, shown in plan in Fig. 14. The bolt 61 forms the axle for the knife 62, allowing said knife to swing laterally. A notch $g$ is formed in one side of the knife, same being located near the bolt 61 on which the knife swings. Formed across the top of casting 51, forward of head 52, is a barrel 63 (Fig. 6) in which slides the horizontal pintle 64, which acts as a guide for the knife 62 and by which it is operated. The left end of pintle 64 is pivoted to the knife by the screw 65. The rear end of the knife is retained normally to the right by the helical spring 66, one end of which is connected to the knife by the screw 67, while its other end is secured to the casting 51 by the screw 68.

Numeral 69 denotes a plate which is secured at its rear to the top of the barrel 63 by the screws $h$ and $h'$. Said plate has two forwardly extending fingers, $k$ and $k'$, the former extending over the disk 54 and the latter, which is turned at right-angles to the former, extends between the disks 54 and 55, both being located to the left of the core 53 as shown in Fig. 5.

Secured to the side of the projection 60, by the screw $j$, and extending thereabove, is the bracket 70. Extending over the forward portion of knife 52 and pivoted to the top of bracket 70 by screw $m$ (Fig. 5) is the cincher 71 whose free or operating end extends around in front of the cinch-disk 54, same having a flat portion which extends in under the disk 54 and a head portion which extends over said disk, as shown in Figs. 6 and 5, respectively. The lateral swinging movements of the cincher 71 may be limited and adjusted by the adjusting-screw 72, the latter being threaded through the bracket 70. Revolubly mounted on the lower extension of the core 53 is the angular gear 73, the smaller end thereof being uppermost. Formed integral with the lower end of gear 73 is the block 74, three sides of which are square the other being rounded. The lower face of block 74 is flush with the lower end of the core 53, there being a notch $p$ formed in one side thereof (Figs. 3, 8, 9). Extending down from block 74, adjoining the side opposite to the rounded side of said block and integral therewith, is the master hook 75, same being to one side of the center of said block, as shown in Fig. 4.

Numeral 76 designates a collar rotatably mounted on the lower extension of the core 53, and located between the lower end of head 52 and the upper end of the gear 73. Rotatably mounted in the core 53, to one side of the center thereof, projecting up beyond collar 76 and down through the lower end of the core, is the stem 77. On the lower projection of stem 77 is formed the minor hook 78. Extending out from stem 77 is a finger 79 (Fig. 4) there being a hole formed in the collar 76 in which said finger may loosely operate, whereby as the collar is moved the stem 77 will be turned, thereby turning the hook 78.

Numeral 80 denotes a finger extending out from collar 76 by which said collar may be moved. Connected to the finger 80 and attached, under tension, to the casting 51 is the spring 81 by which the hook 78 is resiliently returned to its normal position. Extending down from the lower end of the core 53, parallel with the stem 77, and located to one side of the center of said core, is the twister-pin 82. The various movements of the twisters are each controlled by its cam or twister-wheel, 47, 48 or 49. The gear I for instance operating on the gear 73 results in moving the gear 73 and the block 74 during only part of the time the twister-wheel is making a revolution, and during this time the gear 73 is being revolved then the hook 75 is carried around concentric with the core 53, the latter always remaining stationary.

Insuring the tooth 86 always meshing in one of the notches $f$, and preventing turning of the disks 54 and 55 when said tooth is out of commission, we provide the straight edges on the periphery of the disk 55 as shown in Fig. 15. Said straight edges are adapted to slide on contact with the surface of the cam 87 as shown.

Near the point of each needle an eye $x$ is formed therethrough in which is revolubly mounted the two rollers 83 and 84, which are arranged tandem with relation to each other, each having a channel around in its periphery. The wire is adapted to feed between said rollers traveling in said channels thereof as shown.

*Modus operandi.*—Suppose now that the end of the wire which extends up from the spool 26″, for instance, passing up the needle D and through the eye $x$ thereof, between the rollers 83 and 84, to the cincher where it is held as in Fig. 5, and while the end of the wire is being held by the cincher then the bale A is being formed in the compression-chamber, the wire of course being drawn from said spool as the bale is formed, the needle at this time being down. As soon as the bale is completed the spur-wheel 33 will have made its revolution thereby bringing the cam 43 into engagement with the end of bar 44, which will cause the other end of said bar to raise thereby releasing the finger F and allowing the spring 42 to swing the dog 39 to one side where it will be engaged by the lug H, where it will be in the path of the roller 41, thereby allowing said roller to engage the lug H, thereby locking the sprocket-wheel 27 into a unit with sprocket-wheel 37. Now as sprocket-wheel 37 revolves it will result in revolving the shaft 35 therewith, thereby turning the twister wheel 49. During the time the twister-wheel 49 is giving a partial revolution, that is before the gear I has engaged the pinion 73, the needles are moving up to operative position as follows: Simultaneous with the release of finger F the crank 18 will be started to turn, as it is secured on shaft 17. Now as crank 18 turns it will manifestly draw the frame, that is the angle-bars 23 and 23′, toward the shaft 17, which of course will move the needles up to the position shown in Fig. 7, thereby carrying the wire upward in two portions, same being doubled upon itself over roller 83 and locating one portion in front and the other behind the needle. As the needle reaches its upward limit of movement then the rear portion of the wire carried by the needle and that portion of the wire extending down from the cincher will be parallel with each other, both being disposed diagonally across the pin 82 as in Fig. 3. Following the above the turning of wheel 49 will cause the cam 85 to engage the finger 80, turning the collar 76, thereby turning the hook 78 and causing it to engage the pin 82 below said double portions of wire which extend across the pin 82, forming an eye through which said double portions of wire are disposed, as shown in Fig. 8, thereby holding the double wire at that point.

Following the above operation the turning of wheel 49 will cause the tooth 86 (projecting from the ring 87) to engage in one of the notches $f$, thereby turning the disks 54 and 55 the distance of one notch, and during the balance of the revolution of wheel 49 one of the flat faces of disk 55 will slide on the edge of the ring 87, thereby preventing the said disks from being turned except the distance between two notches during the entire revolution of wheel 49, in this connection see Fig. 15. At this time there are two portions of wire in one of said notches *f*: the portion previously cinched and the portion just placed therein by the rear side of the needle, as in Fig. 7. Therefore as the disks are turned the said two portions of the wire in notch *f* will be carried around thereby and they will then be engaged by the cincher, and in position to be engaged by the knife 62, as shown in Fig. 3. As soon as said double portions of the wire are secured by the cincher then the cam 88 will engage the pintle 64, pressing it inward, and thereby causing the knife 62 to close in shearing contact with the lower face of disk 55, which of course will sever the double wires. However it will be noticed that the cincher will continue to hold the wire which extends upward and forward through the needle, as shown in Figs. 3 and 5, therefore as the disk has turned one space it is evident that as the needle moves down it will cause the wire to slide through the eye $x$, still leaving the end of a new portion of wire still secure in the cincher. As soon as said cut has been made then the needle starts to move down, by the means which are apparent, and during the downward movement of the needle the twist or tie is being made as follows: The wire extending around the bale now has two ends projecting up through the eye formed by the hook 78 and the pin 82, as in Fig. 8. At this time the gear I engages the gear-pinion 73 turning same around, preferably four revolutions. The revolving of pinion 73 will of course turn the hook 75 around therewith, causing the angular shoulder of said hook 75 to engage said double, now free, portions of the wire, causing them to slide down into the curved portion of the hook, as in Fig. 9, and then as the hook 75 continues to revolve it is apparent that said double free portions of the wire will be carried around and around the double portions of the wire below the hook 78, thereby forming the loop $E^1$, and the twist $E^2$, as shown in Fig. 20. As soon as the four twists have been made by hook 75 the gear I will leave the pinion 73, allowing the flat or straight side of the block 74 to slide on the face of cam 89 thereby holding the hook 75 in its "at rest" position which is that shown in Fig. 3 or in Fig. 4. Simultaneous with hook 75 attaining its "at rest" position the cam 85 will release finger 80 and allow the spring 81 to bring the collar back to "at rest" position, thereby swinging the hook 78 away from pin 82, as in Fig. 3. As the hooks 75 and 78 attain their "at rest"

positions it will be seen that the knot or tie shown in Fig. 20 will then be free to slide downward away from pin 82, at which time the completed bale A is being ejected ready for a new one to be formed. As the pressure of the machine is released from the bale then the strain will be transferred to the binding wires, and great strain will be exerted upon the tie just formed which will cause it to yield to a certain extent and finally assume the form of the tie $E^3$ shown in Fig. 21.

Indice $E^4$ denotes the waste portion of wire which is formed each time a tie is made, said waste portion being formed by the cincher from the wire which extends over from one to another of the notches *e*.

We desire that it be understood that various changes may be made in the several details of the construction without in any way departing from the spirit of our invention and without sacrificing any of the advantages thereof.

Having now fully shown and described our invention and the best means for its construction and operation to us known at this time, what we claim and desire to secure by Letters Patent of the United States is—

1. In a baling machine having a bale forming chamber and a plunger operative in said chamber, means for locating a plurality of wires around the bale being formed, a twister mechanism for connecting the ends of the wires, means for operating the twisters in proper sequence, said means including a clutch on each side of the machine; each clutch comprising a dog 39 having an outwardly extending finger F which extends beyond the periphery of the clutch, said dog being provided with an oblong aperture G therethrough which loosely surrounds the shaft on which the clutch is mounted, the pivot 40 on which the dog is adapted to swing within the limits of said slot, a lug H extending out from the inner face of the dog, a sprocket wheel 27 mounted on said shaft, a roller 41 located near the periphery of said sprocket and adapted to engage the lug H when the dog is swung in one direction, a spring 42 for returning the dog to its normal position; means for actuating the clutch, and means for connecting the clutch to the twisters, all substantially as shown and described.

2. In a baling machine, a cincher disk and a cutter disk spaced apart and integrally united by a stem, there being notches formed in the periphery of each disk with spaces between each two of the notches the notches on one disk being in alinement with the notches of the other disk, means for operating said disks the distance of one space at each revolution of the twister-wheel, the twister-wheel operating continuously, and a twister mechanism operated by said twister-wheel and adapted to unite the two ends of a single length of wire, all substantially as set forth.

3. In an automatic baling machine having means for forming bales with binding wires disposed therearound, a twister mechanism for each wire comprising a support having a head, a core extending through the head, a cutting disk and a cincher disk formed integral with each other and revolubly mounted on the upper end of the core, a gear wheel revolubly mounted on the lower end of the core, a twister block integral with said gear wheel and located therebelow with its lower face located even with the lower end of said core, a major hook extending down from one side of said block, a minor hook extending down from the end of the core, a twister-pin extending down from the end of the core, said minor hook and twister-pin being located on opposite sides from the center of the core, a twister wheel, means carried by the twister-wheel for operating said gear-wheel, the minor hook, the cutter-disk and the cincher disk in proper relations to each other, substantially as set forth.

4. In an automatic baling machine having means for forming bales with binding wires disposed around the bale being formed, a twister mechanism for each wire and comprising a support having a head, a core projecting through the head, a cutting-disk and a cincher-disk formed integral with each other and revoluble on the upper portion of said core, a gear-wheel revoluble on the lower portion of said core, a twister-block carried on the lower face of said gear-wheel, a collar rotatably mounted on the core at a point above said gear-wheel; a major hook extending down from said twister-block, a minor hook extending down through the core and adapted to be operated by said collar, a twister-pin extending down from said core, a twister-wheel for each twister mechanism and having means for operating said cincher-disk, the cutting-disk, the major hook, and the minor hook, all in progressive succession substantially as set forth.

5. In an automatic baling machine having means for forming bales with binding wires extending therearound, a twister mechanism for each wire comprising a head, a core disposed in a vertical position within the head and extending upward and downward above and below said head, a cutter-disk and a cincher-disk formed integral with each other and revolubly mounted on the upper portion of said core, a gear-wheel revolubly mounted on the lower end of the core, a twister-block carried by said twister gear-wheel, a collar rotatably mounted on the core above said gear-wheel, a major twister-hook carried by and extending down from said block and located to one side from the center of the core, a twister-pin rigidly connected to and extending down from the lower end of the core, a minor hook extending down from the lower end of the core and adapted to swing laterally by the rotation of said collar, a cutting-knife adapted to operate in shearing contact with said cutting-disk, a twister-wheel for each twister mechanism and having a gear on one portion thereof adapted to engage with said gear-wheel, a cam carried by the twister-wheel for operating said collar, a cam carried by the twister-wheel for operating said knife, means carried by the twister wheel for operating said cutter-disk and the cincher-disk, a cincher for coacting with the cincher-disk, and a needle for each wire and adapted to carry the wire and deliver it to the cincher, all substantially as shown and described.

6. In combination with a baling machine, means for operating the various mechanisms from a single source of power, a clutch mechanism adapted to operate by the movement of the bales being formed, said clutch being connected between a loose sprocket and a second sprocket connected to a shaft and comprising a swinging dog, a lug integral with said dog, a roller projecting from the other member of the clutch and adapted to engage said lug when the dog is swung in one direction and to be free therefrom when the dog is swung in the opposite direction, a finger extending out from said dog, a pivoted bar having one end adapted to engage and to be disengaged from said finger, the other end of said bar being operated by a cam controlled by the operation of the bale as it is being formed, all substantially as shown and described.

In testimony whereof we have hereunto subscribed our names to this specification in the presence of two subscribing witnesses.

THOMAS S. PEARSON.
THEODORE M. CONNER.

Witnesses:
JOHN B. JOYCE,
AGNES RIESER.